United States Patent [19]

Sutenbach et al.

[11] Patent Number: 4,600,344
[45] Date of Patent: Jul. 15, 1986

[54] PUSH-ON PLASTIC WING-NUT FASTENER

[75] Inventors: Paul M. Sutenbach, Chicago; Brian R. Peek, Steger; Richard F. Daubert, Tinley Park, all of Ill.

[73] Assignee: Illinois Tool Works Inc., Chicago, Ill.

[21] Appl. No.: 558,397

[22] Filed: Dec. 5, 1983

[51] Int. Cl.⁴ .............................. F16B 37/16
[52] U.S. Cl. .................... 411/435; 411/437; 411/510; 411/512; 411/907; 411/908
[58] Field of Search ............ 411/435, 508-510, 411/512, 437, 908, 416, 423, 418, 409, 182, 429, 431, 433, 436, 904, 907, 913; 10/86 W

[56] References Cited

U.S. PATENT DOCUMENTS

| | | | |
|---|---|---|---|
| 397,988 | 2/1889 | Kimball | 411/435 |
| 2,364,668 | 12/1944 | Simmons | 411/437 |
| 2,878,905 | 3/1959 | Langermeier | 411/908 X |
| 2,889,564 | 6/1959 | Pavlinetz | 411/435 X |
| 2,926,409 | 3/1960 | Perry | 411/512 X |
| 3,006,231 | 10/1961 | Kahn | 411/435 |
| 3,449,799 | 6/1969 | Bien | 411/908 X |
| 3,701,373 | 10/1972 | Wronke et al. | 411/182 |
| 4,239,139 | 12/1980 | Bott | 411/409 X |
| 4,367,995 | 1/1983 | Mizusawa et al. | 411/437 X |
| 4,435,111 | 3/1984 | Mizusawa | 411/437 |
| 4,460,298 | 7/1984 | Solarz et al. | 411/182 X |

FOREIGN PATENT DOCUMENTS 2300928  9/1976  France ................. 411/510

Primary Examiner—Gary L. Smith
Assistant Examiner—Lloyd A. Gall
Attorney, Agent, or Firm—J. P. O'Brien; T. W. Buckman

[57] ABSTRACT

A one-piece plastic wing-nut fastener is constructed to push onto a threaded stud and be held in threaded engagement therewith through the use of a pair of opposing arcuate thin wall sections which are formed with internal threads and which flex radially outward whenever the fastener is pushed onto a threaded stud to provide a ratcheting action therebetween. The thin wall sections are supported on a base member by a U-shaped support having a head section and a pair of leg portions. The pair of leg portions are integrally formed with the base portion and extend between the base portion and head portion in a parallel relationship with the thin wall sections. The pair of thin wall sections are integrally formed between the base and the head portion with its axis in alignment with an enlarged aperture in the base portion and an enlarged central opening in the head portion.

8 Claims, 5 Drawing Figures

PUSH-ON PLASTIC WING-NUT FASTENER

BACKGROUND OF THE INVENTION

Push-on fasteners have a wide variety of uses in assembly line operations where the speed of securing the fastener in place is very important. Many prior art push-on fasteners provide very little holding power because they do not have a threaded engagement relationship between the fastener and the stud on which it is mounted. This invention is an improvement over such prior art devices in that it provides the combination of installing the fastener on a threaded stud by an inward push and a threaded engagement being established through the ratcheting action of the thread surfaces of the fastener over the stud's threads.

One of the objects of designing a push-on fastener is to provide an inexpensive method of manufacture. This invention utilizes a design that can be economically fabricated on injection mold equipment.

As will be more apparent from the following description, the plastic fastener embodying the principles of this invention may be installed rapidly and has a wing-nut configuration for easy removal by unscrewing. The fastener is thereafter reusable and can be molded to conform to other thread types.

SUMMARY OF THE INVENTION

The one-piece plastic wing-nut fastener embodying the principles of this invention is designed to be pushed onto a threaded stud and be held in a threaded engagement by virtue of the ratcheting action provided by a pair of opposing arcuate thin wall sections having internal thread surfaces that together form a plurality of screw threads. The pair of arcuate thin wall sections are supported between a head portion and a base through the use of a pair of spaced leg portions which interconnect the base and head portion and are in parallel with the thin wall arcuate sections. The U-shaped configuration provided by the pair of legs and head portions present a wing nut configuration that facilitates the unscrewing of the fastener from the threaded stud.

DESCRIPTION OF DRAWING

For a better understanding of this invention, reference may be made to the accompanying drawing, in which.

DESCRIPTION OF PREFERRED EMBODIMENT

Figure 1:
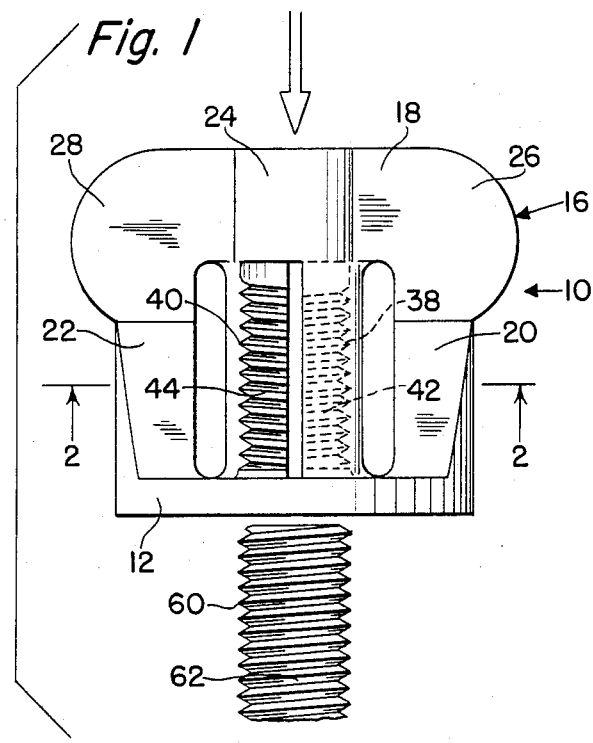
FIG. 1 is a front elevational view of the preferred embodiment of this invention illustrated as it is being pushed onto an upstanding threaded stud.
Figure 2:
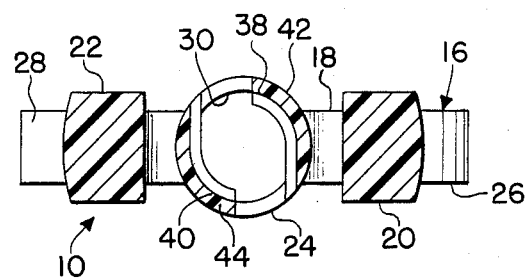
FIG. 2 is a cross-sectional view of FIG. 1 taken along the lines 2—2.
Figure 3:
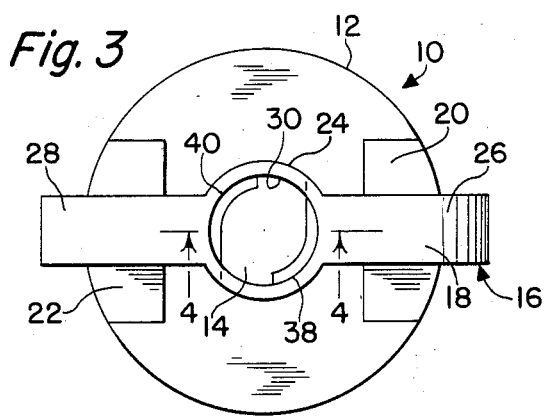
FIG. 3 is a top plan view of the preferred embodiment illustrated in FIG. 1.

Referring now to the drawing, there is shown a one-piece plastic fastener having a wing-nut configuration and generally designated by the reference numeral 10. The fastener 10 has a circular disc base 12 with a central aperture 14 formed through its center portion.

Integrally formed with the base 12 is a U-shaped support 16 which consists of a head portion 18 and a pair of leg portions 20 and 22. The pair of leg portions 20 and 22 are integrally formed with the circular base 12 in a normal relation.

The head portion 18 has a central collar section 24 and a pair of arcuate wing sections 26 and 28 which are integrally connected to the leg portions 20 and 22, respectively. It is noted that the wing sections 26 and 28 are large enough to provide easy gripping and turning by the user.

The collar section 24 has a central opening 30 in axial alignment with the central aperture 14 of base 12 and is of substantially the same diameter as that of aperture 14.

Figure 5:
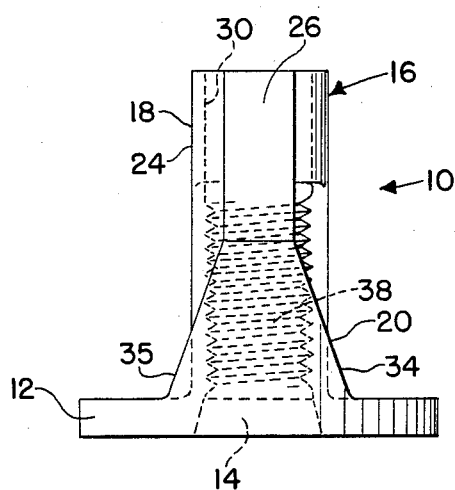
FIG. 5 is a side plan view of the preferred embodiment of FIG. 1 taken from the right side thereof.

As illustrated in FIG. 5, the leg portion 20 of U-shaped support 16 has side edges 34, 35 converging inwardly between the circular base 12 and the head portion 18 in a perpendicular direction to the head portion 18. Leg portion 22 has an identical side configuration. The purpose of the truncated triangular configuration of the leg portions 20 and 22 is to provide a very rigid mounting of the U-shaped support 16 on the base 12.

There is integrally formed between and parallel to the leg portions 20, 22 a pair of opposing thread forming members 38 and 40. The thread forming members 38, 40 are identical in construction and are formed of a thin wall section 42 and 44, respectively. The thin wall sections 42 and 44 are disposed to be axially aligned between the central aperture 14 in base 12 and the central opening 30 in collar section 24. The thin wall sections 42 and 44 have a plurality of threaded surfaces 46 and 48, respectively, formed on the interior wall surfaces, which together form a thread that provides a substantial amount of thread engagement as will be explained hereinafter. It will be appreciated by those skilled in the art that this thread configuration permits a side action tool to form the threads during the molding operation and to be retracted without the need of any rotary motion.

Figure 4:
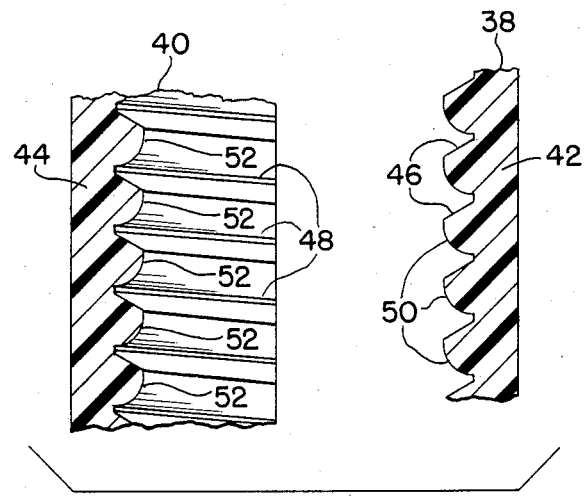
FIG. 4 is an enlarged fractional sectional view taken along the lines 4—4 of FIG. 3.

To ease in the insertion of the fastener 10 on a threaded stud, each flank 50 and 52 of the thread surfaces 46 and 48, respectively, has a convex surface facing the base 12 as depicted in FIG. 4. It will be appreciated from referring to FIG. 4, that the convex flanks 50 and 52 readily ride over the threads of the threaded stud as the fastener 10 is pushed onto the stud.

In the use of this invention, the fastener 10 is readily gripped by the wing sections 26 and 28 and placed onto a threaded stud such as stud 60 illustrated in FIG. 1. The enlarged diameter of central aperture 14 slips over stud 60 and the convex flanks 50 ride over the threads of stud 60 as the fastener 10 is pushed downwardly. As the threads 46 and 48 ride over the stud 60 the thin wall sections 42 and 44 flex radially outwardly to provide a ratcheting action of the threads 46 and 48 over the threads 62 of stud 60.

It is preferred that the length between the collar section 24 of head portion 18 and the base 12 is shorter than the length of the threaded stud 60 so that the upper end of the stud 60 will be seated within the central opening 30 of collar section 24 when the fastener is fully installed on the stud. With the upper end of the stud 60 being retained in the collar section 24, any lateral forces directed to the head of the fastener 10 will prevent it from wobbling.

Once the fastener 10 is pushed onto the threaded stud 60, it will be appreciated that the thread surfaces 46 and 48 of the thin wall section 42 and 44 will be held in threaded engagement with the thread 62 of the stud 60. Thereafter, to remove the fastener 10, it will be necessary to unscrew the fastener by rotating the head section 18 counterclockwise.

We claim:

1. A wing-nut fastener of the type that can be pushed onto a threaded stud and be held in threaded engagement and that is molded into a plastic one-piece structure comprising a base having a central aperture, a U-shaped support having a head portion and a pair of leg portions, said head portion having a central opening in axial alignment with said central aperture, said central aperture and said central opening having a diameter slightly larger than the cross dimension of a particular thread pitch, said leg portions integrally formed with said base, and a pair of thread forming members extending between said base and said head portion, each of said thread forming members having the opposite ends integrally formed with said base and said head portion and having the length of each thread forming member between said opposite ends free to flex, each of said thread forming members having an arcuate thin wall section with internal thread surfaces which together form a plurality of screw threads matching said particular thread pitch in axial alignment with said central opening and said central aperture, where the thickness of said thin wall sections of said thread forming members is selected to permit said thin wall sections to flex radially outward a sufficient amount to permit said plurality of screw threads to ratchet over the threads of a threaded stud having said particular thread pitch when said fastener is pushed inwardly thereon.

2. A wing-nut fastener as defined in claim 1, wherein the flank of each of said thread surfaces of said thin wall sections which faces towards said base has a convex curvature to ease the ratcheting of said plurality of screw threads over the threads of a threaded stud having said particular thread pitch when said fastener is pushed inwardly thereon.

3. A wing-nut fastener as defined in claim 1, wherein the axial distance between said central opening and said central aperture is less than the length of a particular threaded stud such that the free end on said particular threaded stud will be contained in said central opening of said head portion when said fastener is fully seated onto said particular threaded stud to thereby rigidly support said fastener thereon.

4. A wing-nut fastener as defined in claim 1, wherein each of said leg portions taper inwardly from said base towards said head portion in a perpendicular direction relative to the longitudinal dimension of said head portion to thereby reinforce said head portion and said pair of thread forming members.

5. A wing-nut fastener of the type that can be pushed onto a threaded stud and be held in threaded engagement and that is molded into a one-piece plastic structure, comprising a disc-shaped base having a central aperture, a U-shaped support having a head portion and a pair of leg portions, said head portion having a collar-shaped center section with a cylindrical opening in axial alignment with said central aperture, said cylindrical opening and said central aperture having a diameter slightly larger than the cross dimension of a particular thread pitch, said leg portions being integrally formed in a perpendicular relation with said base, and a pair of thread forming members extending between said base and said head portion, each of said thread forming members having the opposite ends integrally formed with said base and said head portion and having the length of each thread forming member between said opposite ends free to flex, each of said thread forming members having an arcuate thin wall section with internal thread surfaces which together form a plurality of screw threads matching said particular thread pitch in axial alignment with said central aperture and said cylindrical opening, where the thickness of said thin wall sections is selected to permit said plurality of screw threads to ratchet over the threads of a threaded stud having said particular thread pitch when said fastener is pushed inwardly thereon.

6. A wing-nut fastener as defined in claim 5, wherein the flank of each of said thread surfaces of said thin wall sections which faces towards said base has a convex curvature to ease the ratcheting of said plurality of screw threads over the threads of a threaded stud having said particular thread pitch when said fastener is pushed inwardly thereon.

7. A wing-nut fastener as defined in claim 5, wherein the axial distance between said cylindrical opening and said central aperture is less than the length of a particular threaded stud such that the free end on said particular threaded stud will be contained in said cylindrical opening of said head portion when said fastener is fully seated onto said particular threaded stud to thereby rigidly support said fastener thereon.

8. A wing-nut fastener as defined in claim 5, wherein each of said leg portions taper inwardly from said base towards said head portion in a perpendicular direction relative to the longitudinal dimension of said head portion to thereby reinforce the support of said head portion and said pair of thread forming members.

* * * * *